US006993158B2

(12) United States Patent
Cho et al.

(10) Patent No.: US 6,993,158 B2
(45) Date of Patent: Jan. 31, 2006

(54) DEVICE FOR AND METHOD OF AUTOMATICALLY TRACKING A MOVING OBJECT

(75) Inventors: Jae-soo Cho, Suwon (KR); Hiroshi Iizuka, Suwon (KR); Kazuhiro Tanaka, Suwon (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 646 days.

(21) Appl. No.: 10/212,142

(22) Filed: Aug. 6, 2002

(65) Prior Publication Data

US 2003/0035051 A1 Feb. 20, 2003

(30) Foreign Application Priority Data

Aug. 7, 2001 (KR) ............................... 2001-47410

(51) Int. Cl.
*G06K 9/00* (2006.01)
(52) U.S. Cl. ........................ 382/103; 382/107; 348/169
(58) Field of Classification Search ................ 382/103, 382/107, 236; 348/236, 14.1, 97, 154, 155, 348/208.1, 208.2, 208.4, 208.13, 252, 402.1, 348/451, 452, 699, 700; 356/3, 27; 73/488
See application file for complete search history.

(56) References Cited

U.S. PATENT DOCUMENTS 5,173,945 A * 12/1992 Pieters et al. ............... 382/107
5,259,040 A * 11/1993 Hanna ......................... 382/107
5,867,584 A 2/1999 Hu et al.
6,079,862 A * 6/2000 Kawashima et al. ........ 382/103
6,445,832 B1 * 9/2002 Lee et al. .................... 382/266

FOREIGN PATENT DOCUMENTS

| JP | 05-046771 | 2/1993 |
| JP | 09-190537 | 7/1997 |
| JP | 10-187996 | 7/1998 |
| JP | 2001-060265 | 3/2001 |
| JP | 2001-076156 | 3/2001 |
| KR | 1020010000107 | 1/2001 |

* cited by examiner

*Primary Examiner*—Kanjibhai Patel
*Assistant Examiner*—Abolfazl Tabatabai
(74) *Attorney, Agent, or Firm*—Staas & Halsey LLP

(57) ABSTRACT

An automatic moving object tracking device and a method thereof are capable of tracking a moving object through a signal process of an input image signal of each frame. The moving object tracking device converts a pre-processed input image signal into a binary disturbance image signal, and calculates a motion value of each pixel through an initial tracking window. After locating the tracking window at the pixel where the motion value is a maximum value, a size of the tracking window is adjusted so that the tracking window can include the moving object therein. Next, based on acquired information about the moving object and the tracking window and previously acquired information about previously frames, a pixel in a following frame is estimated to be a next location of the moving object. The tracking window is positioned at the estimated pixel. If the tracking result is satisfied, the tracking of the moving object continues.

32 Claims, 9 Drawing Sheets

▨ ZOOM-OUT AREA

▨ ZOOM-IN AREA

☐ NON-ZOOM CONTROL AREA

DEVICE FOR AND METHOD OF AUTOMATICALLY TRACKING A MOVING OBJECT

CROSS-REFERENCE TO RELATED APPLICATIONS

This application claims the benefit of Korean Patent Application No. 2001-47410, filed Aug. 7, 2001, in the Korean Industrial Property Office, the disclosure of which is incorporated herein by reference.

BACKGROUND OF THE INVENTION

1. Field of the Invention

The present invention generally relates to a device for and a method of tracking a moving object, and more particularly, to a device for and a method of automatically detecting a moving object through signal processing on input images and continuously tracking the moving object until the moving object escapes out of a monitoring area.

2. Description of the Related Art

There are various types of tracking systems worldwide for automatically detecting and tracking a moving object based on input image information.

The following are a few representative examples of tracking methods applied in such tracking systems that track the moving object through the input image information.
1. Tracking based on a difference signal between two frames
2. Tracking based on a correlation (block matching algorithm)
3. Tracking based on a disturbance map
4. Tracking based on a color distribution
5. Tracking based on an optical flow Despite some advantages, most of the currently available tracking methods including the above are difficult to commercialize due to problems especially in terms of speed and accuracy.

The Korean Patent Publication No. 10-20010000107 published Jan. 5, 2001 discloses a multi moving object tracking and monitoring system, which is a combined form of various tracking methods.

The multi moving object tracking and monitoring system mainly includes a general monitoring device and a local monitoring device. The general monitoring device has a fixed camera monitoring a wide area, and registers and tracks all the moving object within a predetermined monitoring range. For a certain moving object among the registered moving objects, the general monitoring device transmits a tracking command to the local monitoring device to track the certain moving object, and thus, the local monitoring device keeps tracking the certain moving object until the certain moving object escapes out of the monitoring range.

FIG. 1 is a block diagram showing a local monitoring device of a multi moving object tracking and monitoring system.

A local monitoring device 100 includes a camera 10, an image input unit 20 receiving input signal corresponding to images from the camera 10, an image compensation unit 30 eliminating a noise factor from the input image signal, a motion detecting unit 40 detecting a movement of the moving object based on a disturbance map from the compensated input image signal, a moving object extracting unit 50 separating the moving object from the input image signal, a moving object tracking unit 60 tracking the moving object based on extracted position and speed information of the moving object, and a camera movement compensation unit 70 compensating for the input image signal in accordance with a movement of the camera 10.

An operation of the local monitoring device 100 constructed as above will be described below with reference to a flowchart of FIG. 2.

First, when the images taken by the camera 10 are input to the image input unit 20 in operation S1, the image compensate unit 30 filters the input image signal to eliminate noise factors therefrom in operation S2, and the camera movement compensation unit 70 compensates for the input image signal according to the movement of the camera 10 in operation S3. Next, with respect to the compensated input image signal, the motion detecting unit 40 detects the movement of the moving object through the disturbance map algorithm in operation S4. The moving object extracting unit 50 extracts an actual image of the moving object through division and composition of the images in a motion area extracted through a disturbance map in operation S5. Then, the moving object extracting unit 50 estimates a next location of the moving object by applying the extracted location and speed information of the moving object to an estimating algorithm that uses a Kalman filter, and then tracks the moving object in operation S6. When the moving object stops and thus there is no further movement, or when it becomes hard to track the moving object because many objects crossed one another, the tracking is continued by using a block matching process in operation S7. As the movement of the moving object is detected, the camera 10 is moved in accordance with the movement of the moving object in operation S8. After that, the tracking of the moving object includes repeating the above processes.

In this multi moving object tracking and monitoring system, many algorithms are used, and among them, the disturbance map algorithm is representative example that is used to automatically acquire or extract the information about the moving object. For the purpose of the tracking of the moving object, a block matching algorithm is used.

In a conventional moving object tracking system, an extracting performance based on a disturbance map algorithm is satisfactory when a camera is in a static state. However, when the camera is in motion, image compensation is inevitably required. For this purpose, the conventional art uses a camera compensation algorithm, which results in an increased amount of data to be processed by the system and consequent overload in data processing.

A block matching algorithm, which has been used for tracking the moving object, also degrades a data processing speed because a size of a block increases as the moving object is moved, and because the size, shape or brightness changes.

SUMMARY OF THE INVENTION

Accordingly, it is an object of the present invention to provide an automatic moving object tracking device and a method thereof offering a new concept of tracking which does not require a compensation process for a movement of the camera while utilizing advantages of a disturbance map algorithm, i.e., excellent tracking performance on a moving object with a fixed camera. With an improved processing speed and tracking performance, which is respectively resulted from an acquisition of information about the moving object using a least number of image processes and a proper adaptation to a movement of the moving object and to the changes of a surrounding environment.

Additional objects and advantageous of the invention will be set forth in part in the description which follows and, in part, will be obvious from the description, or may be learned by practice of the invention.

The above and other objects are accomplished by providing a moving object tracking device according to an embodiment of the present invention. The moving object tracking device includes a photographing unit photographing a monitoring area, a binary disturbance image generating unit generating a binary disturbance image signal from an input image signal acquired through the photographing unit, a moving object acquiring unit acquiring from the binary disturbance image signal information about the moving object by using a moving window through use of an initial tracking window of a predetermined size and adjusting the size of the initial tracking window so that the binary disturbance image signal contains the moving object therein, a moving object automatic tracking unit estimating a location of the moving object in a following frame to which a center of the moving object is to be moved based on currently acquired information and previously acquired information about the center of the moving object, moving the center of the tracking window to the estimated location where the center of the moving object is estimated to be moved to, and acquiring information about an actual center of the moving object in the tracking window and the size of the tracking window, and a tracking status determining unit comparing actual information about the moving object with the estimated information about the moving object, and determining tracking status based on a resultant error range, the actual information about the moving object being acquired through the following frame.

The moving object tracking device includes an input image pre-processing unit improving a processing speed of the input image signal that is input through a photographing process, and then pre-processing the input image signal to eliminate noises from the input image signal.

The moving object tracking device includes a photographing control unit for moving the photographing direction of the photographing unit to the estimated direction to which the moving object is estimated to be moved, when the center of the tracking window is located outside of the predetermined range with respect to the entire input image area. The photographing control and the signal processing on the input image are both performed in the basis of time-division.

The above and other objects are also accomplished by providing a moving object tracking method according to another embodiment of the present invention. The moving object tracking method includes photographing a monitoring area, generating a binary disturbance image signal from an input image signal acquired through the photographing unit, acquiring from the binary disturbance image signal information about the moving object by using a moving window through use of an initial tracking window of a predetermined size, adjusting the size of the initial tracking window so that the binary disturbance image signal contains the moving object therein, estimating a location in a following frame to which a center of the moving object is to be moved based on currently acquired information and previously acquired information about the center of the moving object, moving the center of the tracking window to the estimated location where the center of the moving object is estimated to be moved to, acquiring information about an actual center of the moving object in the tracking window and the size of the tracking window, and comparing actual information about the moving object with the estimated information about the moving object, and determining tracking status based on a resultant error range, the actual information about the moving object being acquired through the following frame.

The moving object tracking method includes improving a speed of processing the image that is input through the photographing, and then pre-processing the input image to eliminate noises.

The moving object tracking method includes a photographing control operation of moving (changing) a photographing direction of the photographing unit to the estimated direction to which the moving object is estimated to be moved, when the center of the tracking window is located outside of the predetermined range with respect to the entire input image area. The photographing control and the signal process on the input image signal are both performed on a basis of time-division.

According to the moving object tracking device and method thereof in accordance with the present invention, even a smallest image in size is processed during tracking the moving object. Accordingly, the process speed for the image increases. Further, as the controlling of the photographing direction and the processing of the input image signal are performed separately on the time-division basis during the change of the photographing direction to track the moving object, a compensation for the movement of camera is not required, and thus, burden for a data processing operation is lessened.

BRIEF DESCRIPTION OF THE DRAWINGS

These and other objects and advantageous of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
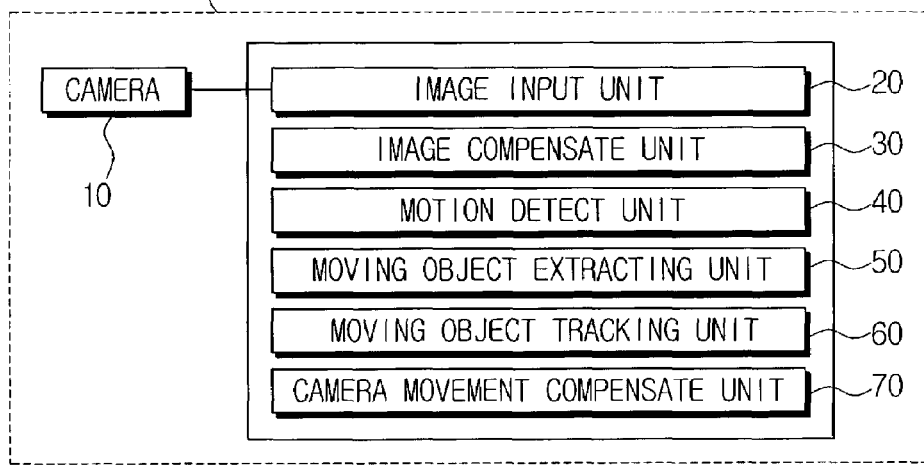
FIG. 1 is a block diagram of a moving object tracking device.
Figure 2:
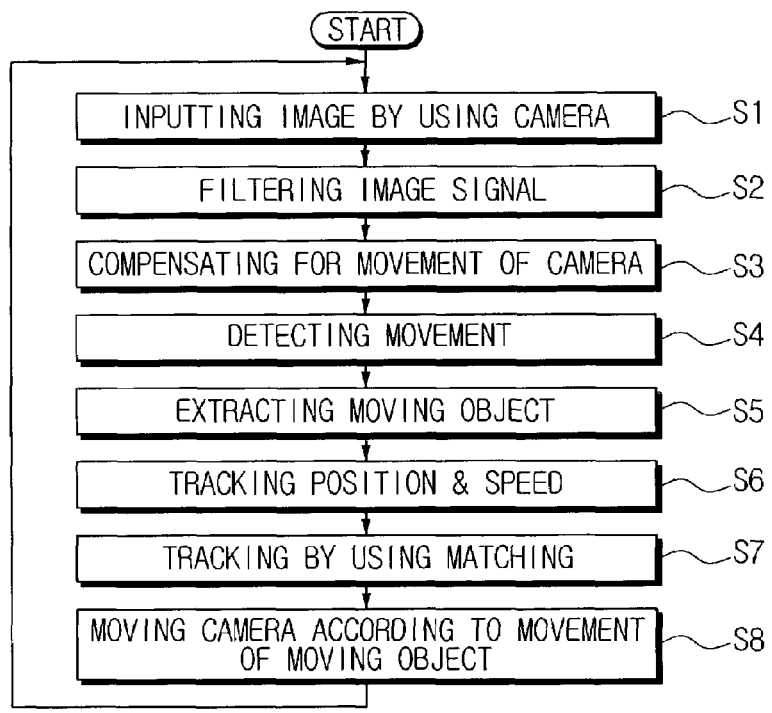
FIG. 2 is a flowchart explaining an operation of the moving object tracking device of FIG. 1.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Hereinafter, the preferred embodiments of the present invention will be described in greater detail with reference to the accompanying drawings.

Figure 3:
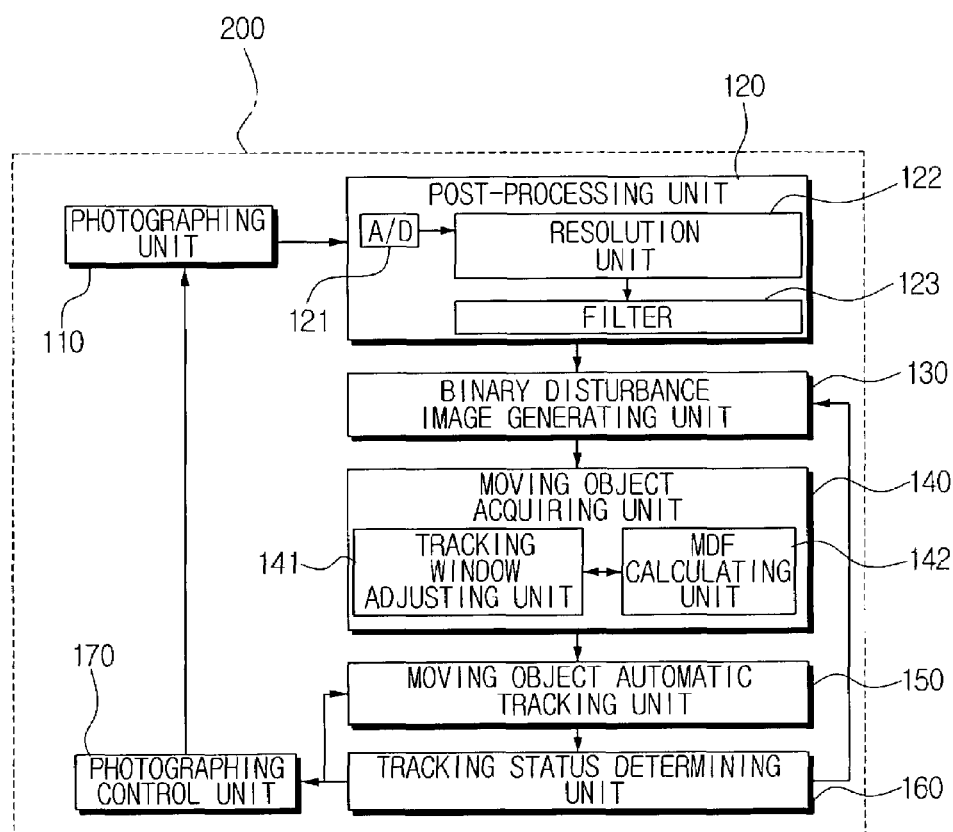
FIG. 3 is a block diagram of a moving object tracking device according to an embodiment of the present invention.

FIG. 3 is a block diagram of a moving object tracking device 200 according to an embodiment of the present invention.

The moving object tracking device 200 includes a photographing unit 110, an input image pre-processing (post-processing) unit 120, a binary disturbance image generating unit 130, a moving object acquiring unit 140, a moving object automatic tracking unit 150, a tracking status determining unit 160 and a photographing control unit 170.

The photographing unit 110 photographs a monitoring area and outputs an analogue image signal corresponding to an input image of the monitoring area.

The input image pre-processing unit 120 includes an analog-to-digital (A/D) converter 121 converting the analog image signal into a digital input image signal so as to acquire desired information, like a center value and a size of the moving object, from the entire input image signal within a shortest time period, a resolution adjusting unit 122 adjusting resolution of the input image signal, and a filter 123 filtering various noises from the input image having the adjusted resolution.

The binary disturbance image generating unit 130 transforms the input image signal into a binary disturbance image signal through a disturbance map algorithm so as to separate from a pre-processed input image a background image and a moving object image, respectively.

Figure 4:
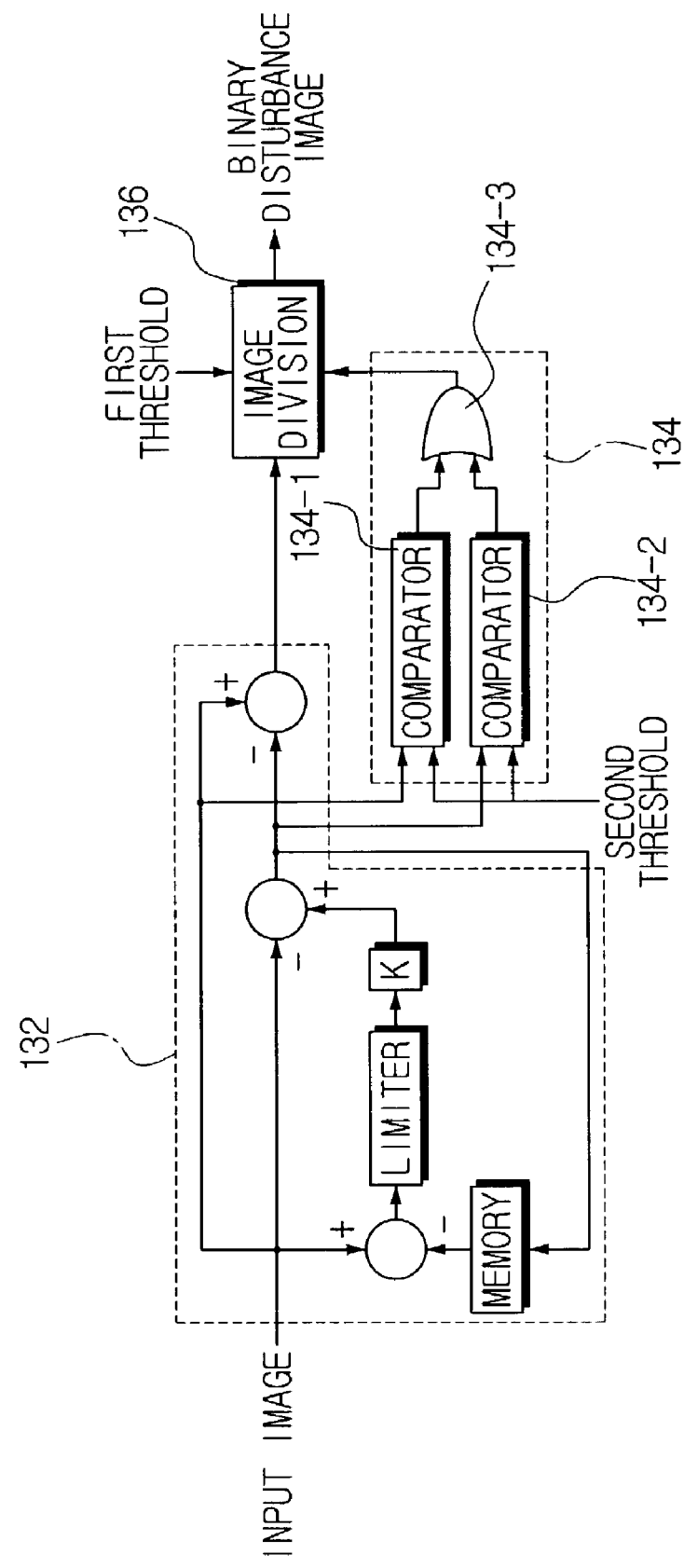
FIG. 4 is a detailed block diagram showing a binary disturbance image generating unit in the moving object tracking device of FIG. 3.

FIG. 4 is a detailed block diagram of the binary disturbance image generating unit 130. The binary disturbance image generating unit 130 includes a recursive filter 132 obtaining a disturbance field through a currently input image signal and an average of previously input image signals, and an image division unit 136 outputting a binary disturbance image signal with respect to each pixel upon comparing an absolute value of the disturbance field obtained by the recursive filter 132 with a first disturbance threshold. The binary disturbance image generating unit 130 further includes a headlight preventing unit 134 modifying a determination of a binary value of the binary disturbance image signal for each pixel so as to prevent particular surrounding factors, like a headlight signal of an automobile from causing an incorrect determination on the moving object.

The headlight preventing unit 134 includes a first comparator 134-1 and a second comparator 134-2 comparing the input image signal and the disturbance field of the current frame with a second disturbance threshold, respectively, and an OR gate 134-3 performing an OR-operation with respect to an output value from the first and second comparators 134-1, 134-2.

When the moving object acquiring unit 140 acquires the information about the moving object in a first tracking operation, or in a re-attempt after the first tracking operation has failed, the moving object acquiring unit 140 acquires the center value and the size of the moving object by using a tracking window. For this purpose, the moving object acquiring unit 140 includes a motion disturbance function (MDF) calculating unit 142 calculating a motion disturbance function (MDF) of each of the pixels in a predetermined range based on a moving window concept that uses an initial tracking window having a predetermined size, and a tracking window adjusting unit 141 that searches for a pixel having a greatest MDF and adjusts the size of the initial tracking window by calculating the center and the size of the moving object within an actual tracking window with reference to the pixel of the greatest MDF. The MDF calculating unit 142 adds binary values of coordinates of the initial tracking window from first to final coordinates and determines a sum of the coordinates as the MDF of the pixel serving as a center coordinate. The information about the center of the moving object is used for a fan/tilt control signal to control the photographing unit 110 while the information about the size of the moving object is used for a zoom-in/zoom-out control signal to control the photographing unit 110.

Based on current and previous acquired information, the moving object automatic tracking unit 150 estimates a next location in a following frame where the center of the moving object is to be moved, moves the center of the size-adjusted tracking window to the estimated next location, and acquires the information of the center of the moving object in the following frame in the size-adjusted tracking window and the information of the size of the size-adjusted tracking window. In other words, only the image signal corresponding to the moving object within the size-adjusted tracking window is processed in the following frame.

The tracking status determining unit 160 compares the information of an actual image of the moving object acquired from the following frame with the estimated information of the moving object to generate a resultant error range, and determines a tracking status of the moving object based on the resultant error range. Alternatively, the tracking status determining unit 160 can determines the tracking status by monitoring a number of binary disturbance image signal of pixels disposed in the size-adjusted tracking window. When an error of the tracking status is within a predetermined range, the moving object automatic tracking unit 150 continues tracking the moving object using exclusive signal processing on an area of the size-adjusted tracking window. When the error exceeds the predetermined range, the moving object acquiring unit 140 re-acquires information about the moving object of the entire input image and repeats automatic tracking processes.

The photographing control unit 170 controls a photographing direction of the photographing unit 110 in an estimated moving direction of the moving object when the center of the tracking window with respect to the entire input image is located outside the predetermined range. The photographing control unit 170 also controls zoom-in/zoom-out of the photographing unit 110 so that the size of the tracking window at the estimated pixel and the size of the moving object acquired from the following frame can be maintained at a certain rate. Both the photographing controlling like the fan/tilt control, the zoom-in/zoom-out control, and a movement of the photographing control unit 170, and the signal processing of the input image are performed on a time-division basis.

A method of tracking the moving object in the moving object tracking device 200 of FIGS. 3 and 4 will be described below with reference to a flowchart of FIG. 5.

First, a system acquires the analog image signal by photographing a monitoring area through the photographing unit 110 in operation S10. Then the system pre-processes the acquired image signal in operation S20 to generate the input image signal. The pre-processing in operation S20 includes adjusting the resolution of the input image signal so as to increase a signal processing speed in operation S21, and filtering the input image signal having the adjusted resolution so as to eliminate the noises from the input image signal in operation S22. After the pre-processing operation in operation S20, the input image signal (post-processed input image signal) is binarized (transformed) to the binary disturbance image signal though the disturbance map algorithm in operation S30.

The disturbance map algorithm generates a disturbance field $\Delta_t$ by using a difference of the currently input image $I_t$ and the background image $A_t$ (average image $A_{t-1}$ of previously input images) and detects a motion area of the moving object based on the disturbance field $D_t$. For this purpose, the background image $A_t$ is generated when a historical weight $\omega$ is applied on the average image $A_{t-1}$ of the previously input images. The binary disturbance image signal and the background image are obtained with respect to the current frame by:

Mathematical expressions 1

$$\Delta_t = I_t - A_{t-1}$$

$$A_t = I_t - K \cdot LIM(I_t - A_{t-1})$$

where $\Delta_t$ is a disturbance of a current frame, $A_t$ is either a background image or an average image of current frames, $A_{t-1}$ is either a background image or an average image of previous frames, $I_t$ is a currently input image, K is a gain, and LIM is a limiter.

The disturbance map algorithm has a value '1' in the motion area where the object is moving, and has a value '0' in a motionless area. In other words, when the absolute value of the binary disturbance image signal for each pixel exceeds a predetermined threshold, it is determined as the motion area, and if the absolute value is below the predetermined threshold, it is determined as the motionless area.

Then each signal of the disturbance field of the binary disturbance image signal from the mathematical expressions 1 is image-divided based on first and second thresholds. The image division is performed such that the motion area has the value of '1' while the motionless area has the value of '0'.

The transformed binary disturbance image signal is displayed in white in the motion area and in black in the background area (motionless area). Meanwhile, according to this embodiment of the present invention, the output from the headlight preventing unit 136 is used as a parameter that determines the binary values of the respective pixels so as to prevent the inaccurate (incorrect) determination with respect to the motion area due to the headlight from the automobile, etc.

When the input image signal is converted into the binary disturbance image signal, the moving object acquiring unit 140 acquires from the binary disturbance image signal the information about the center and the size of the moving object through the initial tracking window of a predetermined size in operation S40. In other words, the moving object acquiring unit 140 acquires the information about the center of the moving object and the size of the tracking window in the area of the entire image where the moving object is located. For the information about the moving object, MDFs of the respective pixels are calculated in the binary disturbance image signal based on a concept of a moving window in operation S42.

Figure 5:
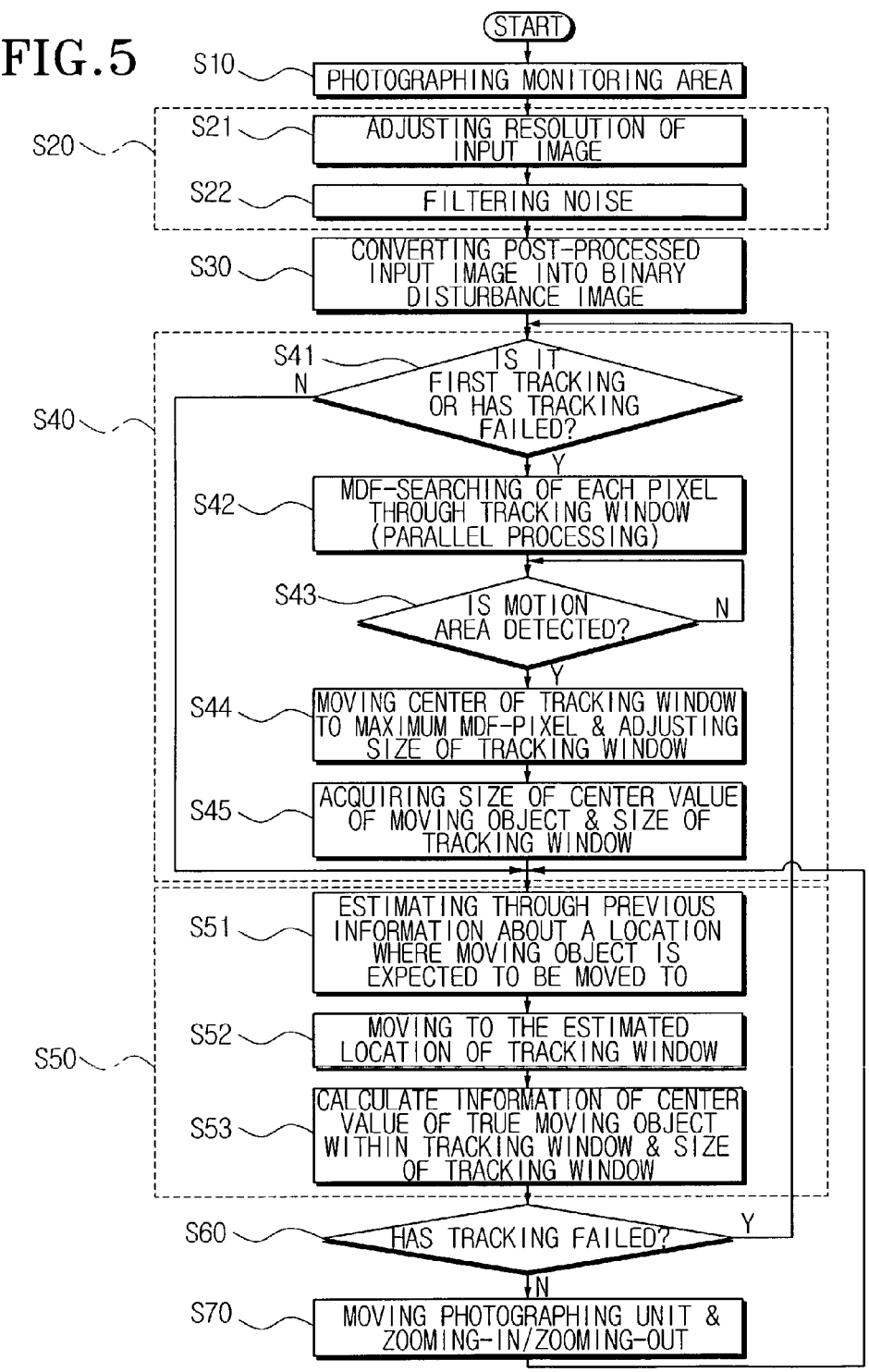
FIG. 5 is a flowchart explaining a method of tracking a moving object in the moving object tracking device of FIGS. 3 and 4.
Figure 6:
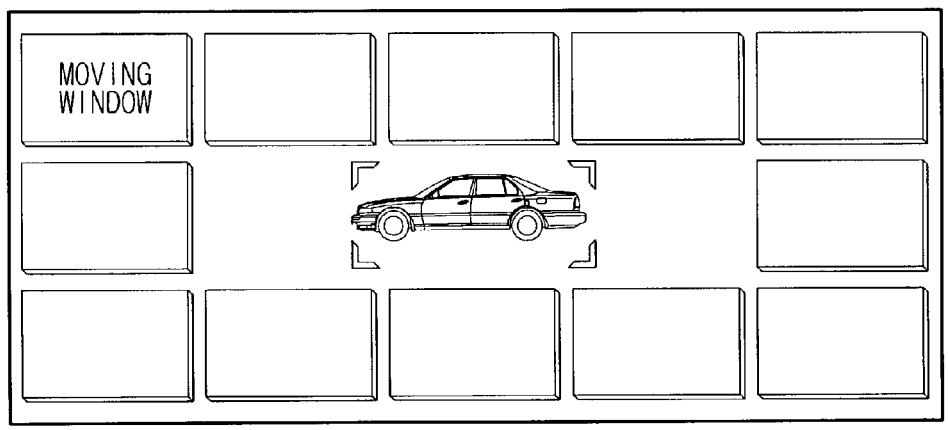
FIG. 6 is a view explaining a concept of a moving window in the moving object tracking device and method of FIGS. 3 through 5.

FIG. 6 shows the concept of the moving window according to the moving object tracking device 200 of FIG. 3 and the method of FIG. 5.

The moving window, which is formed of a predetermined size, has each pixel as a center coordinate and searches the MDF corresponding to each pixel of the input image. The sum of the binary values of pixels in the moving window is determined as a certain value, i.e., the MDF of the pixel located at the center coordinate.

The moving windows are identical to the initial tracking windows in size, and are generated in number less than a total number of the pixels. The sums obtained by adding up the binary values of the coordinates from the initial to the final coordinates within the respective initial tracking windows, are determined as the MDFs of respective moving windows and the respective pixels located at the center coordinates. Meanwhile, for a real-time processing operation, the searching of the MDF with respect to each pixel is performed in parallel.

The MDF of each pixel through the moving window is calculated by:

$$MDF(p, q) = \sum_{x \in MW} \sum_{y \in MW} B(x+p, y+q) \quad \text{Mathematical expression 2}$$

where $M1_{xc} \leq p \leq Mn_{xc}$, $M1_{yc} \leq p \leq Mn_{yc}$,

MDF is a motion disturbance function, p, q is a coordinate of a certain pixel in the entire input image, x, y is a coordinate of a certain pixel within a moving window, MW is a moving window, $M1_{xc}$, $M1_{yc}$ is a center coordinate in the moving window containing an initial coordinate of the entire input image, $Mn_{xc}$, $Mn_{yc}$ is a center coordinate in the moving window containing a final coordinate of the entire input image, and B(Binary) is a binary disturbance image signal.

Figure 7:
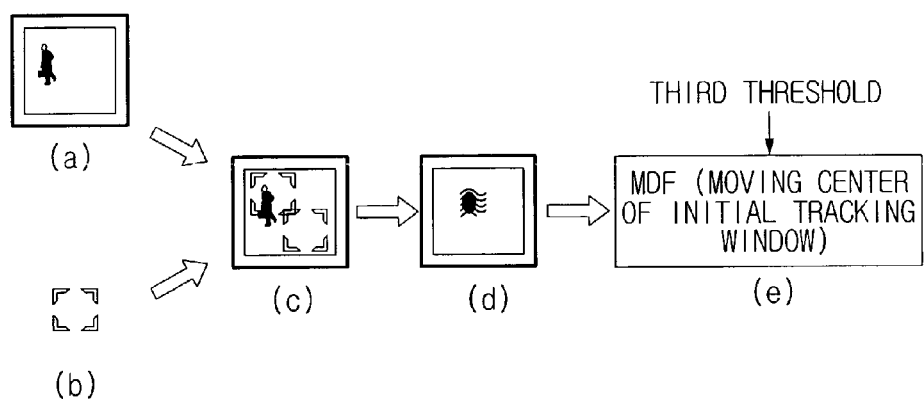
FIG. 7 is a view showing a moving object acquiring process in the moving object tracking device and method of FIGS. 3 through 5.

FIG. 7 shows a process of acquiring the information about the moving object.

Referring FIG. 7, the MDFs of respective pixels (c) are calculated through a plurality of initial tracking windows (b) with respect to the binary disturbance image (a). Then the MDF field with respect to the moving object (d) is detected. If the maximum (greatest) MDF equals to, or greater than a third threshold, the center of the initial tracking window is positioned at the pixel having the maximum MDF. Then the size of the initial tracking window is adjusted so that the initial tracking window includes the moving object, and then the center coordinate of the moving object in the adjusted-sized tracking window and the size of the tracking window (e) are calculated. If the MDF is below the third threshold, it is determined that there is no moving object in operation S43 of FIG. 5. The center coordinate of the moving object in the tracking window is obtained by:

$$x_e = \frac{\sum_{(x,y)\in TW} x \cdot B(x - p_L, y - q_L)}{\sum_{(x,y)\in TW} B(x - p_L, y - q_L)}$$

$$y_e = \frac{\sum_{(x,y)\in TW} y \cdot B(x - p_L, y - q_L)}{\sum_{(x,y)\in TW} B(x - p_L, y - q_L)}$$

Mathematical expressions 3 where
  $x_e$, $y_e$ is a center coordinate of the moving object in the tracking window,
  TW is a tracking window,
  x, y is the certain coordinate in the tracking window,
  B is the binary disturbance image signal, and
  $p_L$, $q_L$ is a coordinate of a spot where the MDF is a maximum value in the entire input image.

As described above, the size of the moving object can be calculated by calculating a center value of the actual moving object in the tracking window. The size of the tracking window can also be adjusted based on a size rate of the moving object and the tracking window. An occupancy rate of the moving object to adjust the size of the tracking window is calculated by the following expression:

$$\text{Occupancy rate} = \frac{\text{Moving Object Size}}{\text{Tracking Window Size}} \quad \text{Mathematical expression 4}$$

Figure 8:
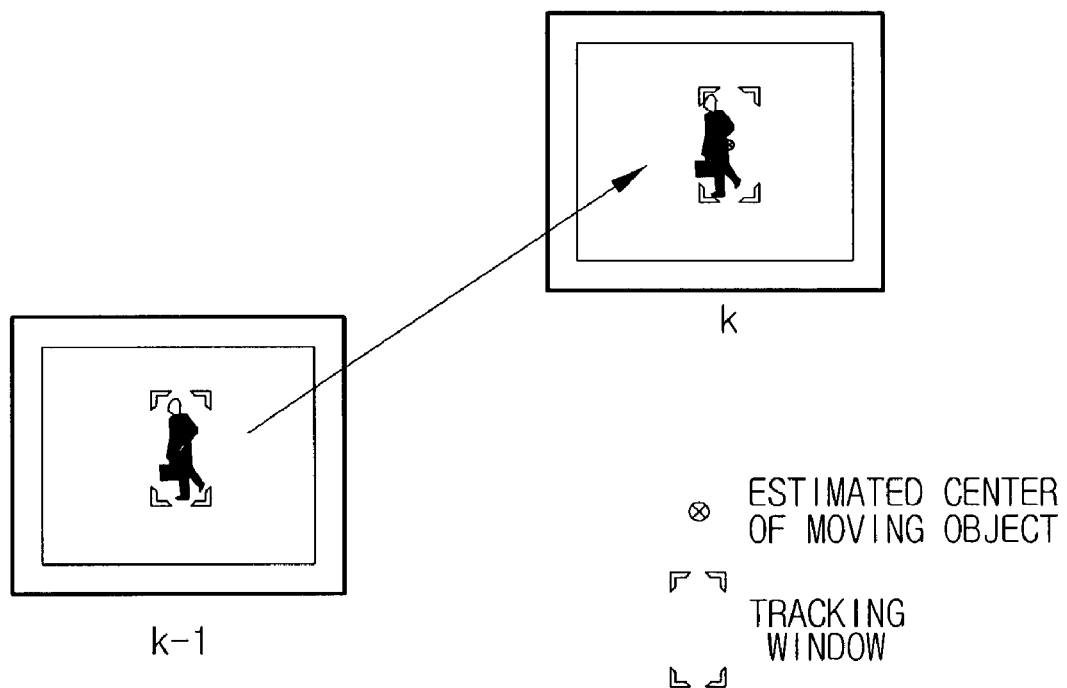
FIG. 8 is a view showing a process of automatically tracking the moving object in the moving object tracking device and method of FIGS. 3 through 5.

When the moving object is detected and the size of the tracking window is adjusted, the location of the moving object is estimated and the moving object is tracked automatically in operation S50 of FIG. 5. In other words, based on the acquired information about the current and previous center of the moving object, the next location of the moving object is estimated in the following frame in operation S51, and the center of the tracking window having the adjusted size is disposed at the estimated location in operation S52. FIG. 8 shows the tracking window being re-arranged to the estimated location of the moving object in the following frame based on the previously acquired information. Next, the information about the true center of the moving object of the following frame in the tracking window and the information about the size of the tracking window are acquired in operation S53. When the information about the actual moving object is acquired in the following frame, the acquired information is compared with the estimated information, and the tracking status is determined according to the error range of the comparison in operation S60. When the error range is within a predetermined limit, the moving object automatic tracking unit 150 keeps tracking the moving object while performing the signal process only with respect to the area of the tracking window. If the error rate exceeds the predetermined limit, the moving object acquiring unit 140 re-acquires the information about the moving object in the entire input image.

Meanwhile, if the error range of the tracking status is within the predetermined limit, it is determined as the tracking of the moving object is performed well, so that the system controls the movement, the zoom-in/zoom-out and the fan/tilt of the photographing unit 110 in operation S70.

Figure 11:
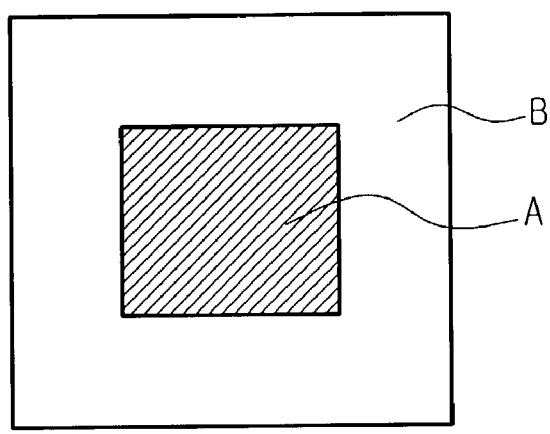
FIG. 11 is a view showing an entire image being divided into a camera fan/tilt control area and a non camera fan/tilt control area in the moving object tracking device and method of FIGS. 3 through 5.
Figure 12:
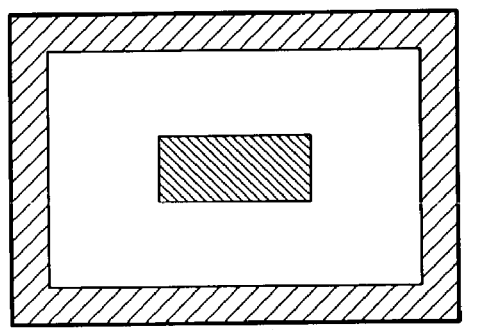
FIG. 12 is a view showing the entire image divided according to a size of a tracking window, into a camera zoom-in/zoom-out control area and a non-camera zoom-in/zoom-out control area in the moving object tracking device and method of FIGS. 3 through 5.

When the center of the tracking window is located outside the predetermined range in the entire input image, the system changes the photographing direction of the photographing unit 110 to the estimated direction of the moving object. Further, when the center of the tracking window is located within a predetermined range A of the entire input image area B as shown in FIG. 11, the system controls so that the fan/tilt control is not performed. The system also controls the zoom-in/zoom-out automatically, so that the size of the tracking window and the moving object can be maintained at a certain rate according to the size of the actual moving object that is acquired from the following frame of the tracking window. As shown in FIG. 12, the system can either perform or omit the process of the zoom-in/zoom-out control depending on the location of the moving object in the input image. Accordingly, unnecessary shaky image due to an excessive control can be prevented while reliability of the system tracking the moving object improves.

Figure 9:
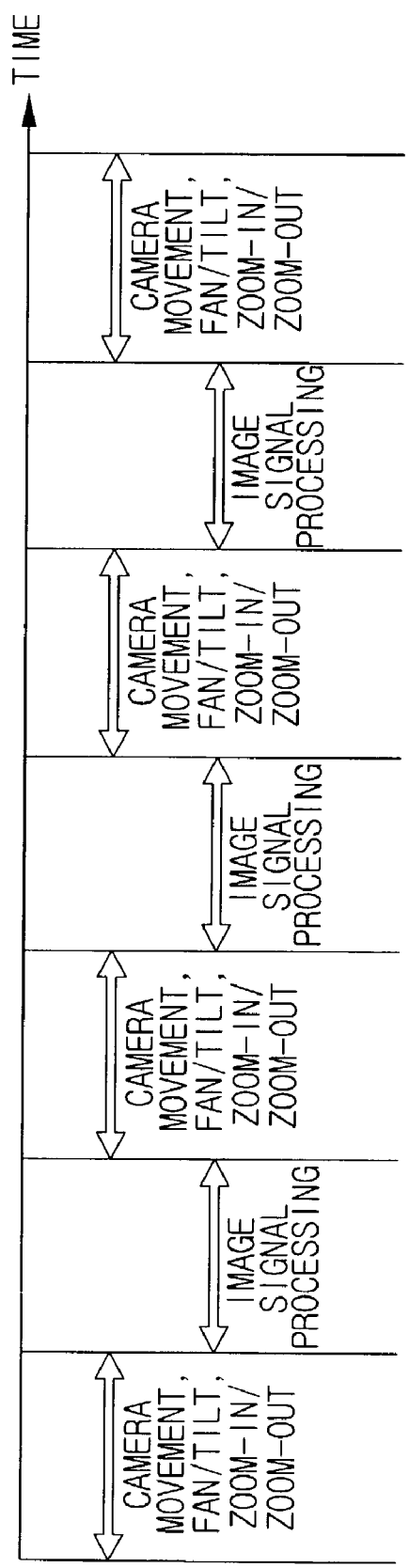
FIG. 9 is a view showing a camera control process and an image signal process on a basis of time division in the moving object tracking device and method of FIGS. 3 through 5.
Figure 10:
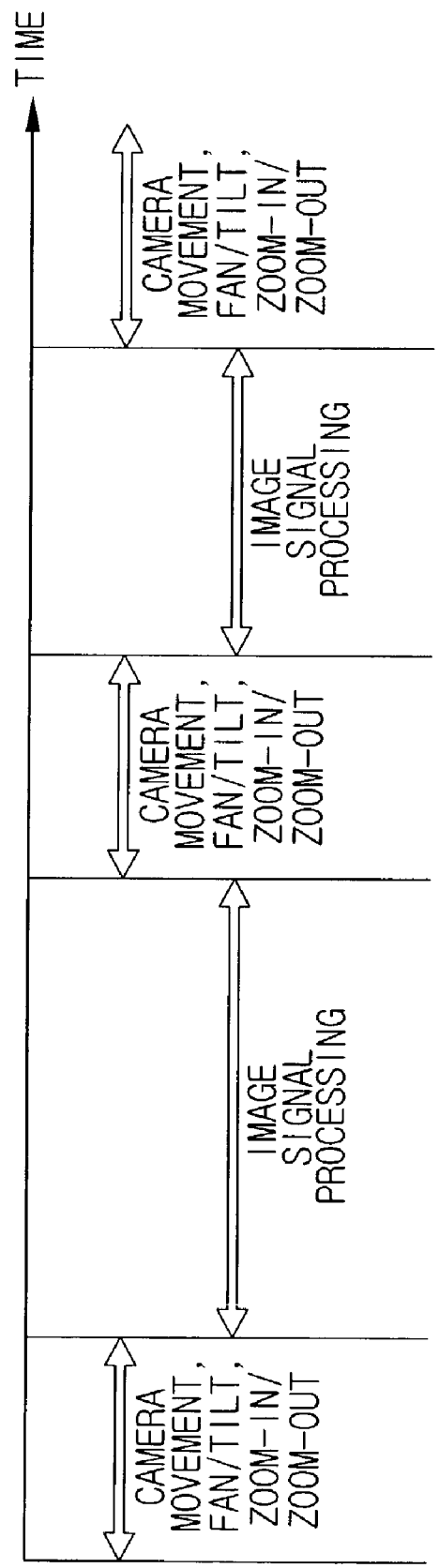
FIG. 10 is a view showing another embodiment of the camera control process and the image signal process of FIG. 9.

The controlling of the photographing unit 110 and the signal process with respect to the input image are performed in the time-division basis as shown in FIG. 9. Accordingly, no image compensation is required for the movement of the photographing unit 110 (camera). FIG. 10 shows the controlling of the photographing unit 110 and the image signal process according to another embodiment of the present invention, which provides a sufficient time for the initial image signal process of acquiring information about the moving object.

As a result, the automatic moving object tracking device and method thereof processes even a smallest sized image through the use of the tracking window.

Further, by using the time-division for the control of the camera such as camera movement, the zoom-in/zoom-out and the fan/tilt, and also for the image signal process, image compensation for the movement of the camera can be avoided.

Further, the inaccurate determination on the motion area due to the headlight of the automobile can be prevented through the use of the headlight preventing unit 134.

Further, an accurate fan/tilt control can be achieved by the center value of the moving object, and the moving object can be automatically zoomed-in/zoomed-out based on the size of the moving object and the size of the tracking window. Such zoom-in/zoom-out control can be very useful in circumstances like when a numeral and a character in a license plate of an automobile parked in a parking lot is checked.

With the automatic moving object tracking device and method thereof according to the present invention, a minimum amount of images is processed during the tracking of the moving object. Accordingly, the processing speed increases while influences on the moving object due to interferences with the other objects can be minimized.

Further, since the image compensation for the movement of camera can be omitted according to the present invention, a complex signal process in accordance with the tracking of the moving object is simplified.

Further, the inaccurate determination on the moving object due to changes in the background such as headlight from the automobile can be prevented.

Further, since the fan/tilt and zoom-in/zoom-out is controlled very accurately with respect to the moving object, the moving object can be clearly recognized while a monitoring result on the monitoring area is checked.

Although the preferred embodiments of the present invention have been described, it will be understood by those skilled in the art that the present invention should not be limited to the described preferred embodiments, but various changes and modifications may be made without departing from the principles and spirit of the present invention, the scope of which is defined by the appended claims and equivalents.

What is claimed is:

1. An automatic moving object tracking device, comprising:
   a photographing unit photographing a monitoring area;
   a binary disturbance image generating unit generating a binary disturbance image signal from an input image signal of each frame acquired through the photographing unit;
   a moving object acquiring unit acquiring from the binary disturbance image signal information about a moving object by using a moving window as an initial tracking window having a predetermined size, and adjusting the initial tracking window in size so that the binary disturbance image signal contains the moving object therein;
   a moving object automatic tracking unit estimating information about a location in a following frame to which a center of the moving object is to be moved based on currently acquired information and previously acquired information about the center of the moving object, moving a center of the moving window to the estimated location where the center of the moving object is estimated to be moved to, and acquiring actual information about an actual center of the moving object in the moving window and the size of the tracking window; and
   a tracking status determining unit comparing the actual information about the moving object with the estimated information about the moving object, and determining a tracking status of the moving object based on a resultant error range of the actual information and the estimated information, the actual information about the moving object being acquired through the following frame.

2. The automatic moving object tracking device of claim 1, further comprising:
   an input image pre-processing unit improving a processing speed of the input image signal that is input through a photographing process of the photographing unit and pre-processing the input image signal to eliminate a noise from the input image signal.

3. The automatic moving object tracking device of claim 2, wherein the input image pre-processing unit comprises:
   a resolution adjusting unit reducing a resolution of the input image signal; and
   a filter eliminating the noise from the input image signal having the reduced resolution.

4. The automatic moving object tracking device of claim 1, wherein the binary disturbance image generating unit comprises:
   a disturbance field generating unit generating a disturbance field through a difference between the input image signal of a current frame and an average of previous frames;
   a headlight preventing unit comparing respective ones of the input image signal and the average of the previous frames with a threshold, and performing a logic-operation on a result of the comparison; and
   an image division unit determining a binary value for each pixel according to a result of comparing an absolute value of each pixel of the disturbance field with a disturbance threshold and also according to a result of the logic-operation of the headlight prevention unit.

5. The automatic moving object tracking device of claim 4, wherein the moving object acquiring unit comprises:
   a moving disturbance function (MDF) calculating unit determining a moving disturbance function (MDF) value of a pixel corresponding to a center coordinate by adding up binary values of first through last coordinates in the initial tracking window of the binary disturbance image signal; and
   a tracking window adjusting unit adjusting the size of the tracking window by calculating the center coordinate of an actual moving object and a size of the moving object with reference to a pixel having a greatest MDF value.

6. The automatic moving object tracking device of claim 5, wherein the MDF calculating unit calculates MDF values for pixels in parallel with each other.

7. The automatic moving object tracking device of claim 5, wherein the tracking window adjusting unit adjusts the moving window so that the moving object is included in the input image signal with respect to a coordinate of a pixel having a greatest MDF value.

8. The automatic moving object tracking device of claim 7, wherein the tracking window adjusting unit determines that there does not exist the moving object when the greatest value of the MDF value calculated by the MDF calculating unit is below an MDF threshold, and the tracking window adjusting unit does not adjust the moving window upon the determination on the moving object.

9. The automatic moving object tracking device of claim 7, wherein the tracking window adjusting unit adjusts the size of the moving window by using a size rate of a current moving window and a following moving window of the moving object.

10. The automatic moving object tracking device of claim 1, wherein the tracking status determining unit determines a tracking failure when an error of the estimated center value and a measured center value of the moving object equals or is greater than a predetermined range, or when the number of pixels of the binary disturbance image signal in the moving window is below a threshold, and accordingly re-acquires the information of the moving object from an entire image signal through the moving object acquiring unit.

11. The automatic moving object tracking device of claim 1, further comprising a photographing control unit controlling the photographing unit in a manner such that the photographing unit continues photographing in a fixed position when the center and size of the moving object acquired through the moving object acquiring unit is within a predetermined range that does not require a change of a photographing direction and a zoom-in/zoom-out of the photographing unit, and that the change of the photographing direction and the zoom-in/zoom-out are performed when the center and size of the moving object exceeds the predetermined range.

12. The automatic moving object tracking device of claim 11, wherein the photographing control unit controls the zoom-in/zoom-out of the photographing unit so that the size of an actual moving object acquired from the following frame is maintained at a certain rate with respect to the size of the moving window of a current frame.

13. The automatic moving object tracking device of claim 12, wherein the controlling of the photographing unit and the signal processing of the input image signal are performed on a time-division basis.

14. An automatic moving object tracking method, comprising:

photographing a monitoring area using a photographing unit;

generating a binary disturbance image signal from an input image signal acquired through the photographing unit;

acquiring from the binary disturbance image signal information about the moving object by using a moving window as an initial tracking window having a predetermined size;

adjusting a size of the initial tracking window so that the binary disturbance image signal contains the moving object;

estimating information about a location of the moving object in a following frame to which a center of the moving object is to be moved based on currently acquired information and previously acquired information about a center of the moving object;

moving a center of the moving window to the estimated location where the center of the moving object is estimated to be moved to;

acquiring actual information about an actual center of the moving object in the moving window and the size of the moving window; and comparing the actual information about the moving object with the estimated information about the moving object, and determining tracking status of the moving object based on a resultant error range of the estimated and actual information, the actual information about the moving object being acquired through the following frame.

15. The automatic moving object tracking method of claim 14, further comprising:

improving a speed of processing the input image signal that is input through the photographing unit, and then pre-processing the input image signal to eliminate a noise from the input image signal.

16. The automatic moving object tracking method of claim 15, wherein the pre-processing of the input image signal comprises:

modifying a resolution of the input image signal; and eliminating the noise from the input image signal having the reduced resolution.

17. The automatic moving object tracking method of claim 14, wherein the generating of the binary disturbance image signal comprises:

generating a disturbance field through a difference between the input image signal and an average of previous frames;

comparing the input image signal with a threshold and the average with the threshold to perform a logic-operation on a result of the comparison; and determining a binary value for each pixel according to a result of comparing an absolute value of each pixel of the disturbance field with a disturbance threshold and also according to the result of the logic-operation.

18. The automatic moving object tracking method of claim 14, wherein the acquiring of the moving object comprises:

positioning the initial tracking window so that each pixel is recognizable with a center coordinate in the binary disturbance image signal;

determining a moving disturbance function (MDF) value of a pixel by adding up binary values of initial through last coordinates in the moving window; and adjusting a size of the moving window so that the moving object is included in the input image signal with respect to a coordinate of a pixel having a greatest MDF value in the binary disturbance image signal.

19. The automatic moving object tracking method of claim 18, wherein the calculating of the MDF comprises calculating MDF values for pixels in parallel with each other.

20. The automatic moving object tracking method of claim 18, wherein the acquiring of the moving object determines that there does not exist the moving object when the binary value of the coordinate of the pixel having the greatest MDF value is smaller than an MDF threshold.

21. The automatic moving object tracking method of claim 14, wherein the determining of the tracking status comprises re-acquiring from the entire input image signal the information about the moving object with respect to the following frame when the error range exceeds a predetermined limit.

22. The automatic moving object tracking method of claim 14, further comprising:

controlling the photographing unit to move a photographing direction of the photographing unit to an estimated direction to which the moving object is estimated to be moved when the center of the moving window is located outside of a predetermined range with respect to the entire input image signal of the monitoring area.

23. The automatic moving object tracking method of claim 14, further comprising:

zooming-in/zooming-out of the photographing unit so that the size of the tracking window located at the estimated location and the size of the moving object acquired from the following frame are maintained at a certain rate.

24. The automatic moving object tracking method of claim 23, wherein the photographing control of the photographing unit and the signal processing of the input image signal are both performed on a basis of time-division.

25. The automatic moving object tracking method of claim 23, wherein the controlling of the photographing unit is discontinued when the tracking window is located within the predetermined range with respect to the entire input image area.

26. An automatic moving object tracking device, comprising:

a photographing unit photographing a monitoring area to generate an input image signal of each frame;

a binary disturbance image generating unit generating a binary disturbance image signal from input image signals of current and previous frames;

a moving object acquiring unit generating a moving window, acquiring information about a moving object from the binary disturbance image by using the moving window, and adjusting a size of the moving window in response to the information;

a moving object automatic tracking unit estimating a location of the moving object in a following frame based on the centers of the moving object in the current and previous frame and acquiring an actual center of the moving object in the moving window in the following frame;

a tracking status determining unit generating tracking status upon comparing the actual center of the moving object with the estimated center of the moving object; and a photographing control unit controlling the photographing unit in response to the tracking status.

27. The automatic moving object tracking device of claim 26, wherein the moving object automatic tracking unit moves a center of the moving window to the estimated location in the following frame to detect the actual center of the moving object in the following frame.

28. The automatic moving object tracking device of claim 26, wherein moving object acquiring unit comprises:
   a moving disturbance function (MDF) calculating unit determining a moving disturbance function (MDF) value of a pixel corresponding to a center coordinate by adding up binary values of coordinates in the moving window of the binary disturbance image signal; and
   a tracking window adjusting unit adjusting the size of the moving window by calculating the center coordinate of the moving object of the current frame and a size of the moving object with reference to a pixel having a greatest MDF value.

29. The automatic moving object tracking device of claim 26, wherein the MDF value is calculated from a disturbance of the current frame using the following formula:

$$\Delta_t = I_t - A_{t-1}$$

$$A_t = I_t - K \cdot LIM(I_t - A_{t-1})$$

where $\Delta_t$ is the disturbance of the current frame, $A_t$ is either a background image or an average of images of the current frame, $A_{t-1}$ is either a background image or an average of images of a previous frame, $I_t$ is a currently input image, K is a gain, and LIM is a limiter.

30. The automatic moving object tracking device of claim 26, wherein the binary disturbance image generating unit comprises:
   a first subtractor subtracting a previous input image signal from a current input image signal;
   a second subtractor subtracting a first output of the first subtractor from the current input image signal;
   a third subtractor subtracting a second output of the second subtractor from the current input image signal; and
   an image division unit comparing a third output of the third subtractor with a reference value to generate the binary disturbance image signal.

31. The automatic moving object tracking device of claim 30, wherein the binary disturbance image generating unit comprises:
   a limiter limiting the first output of the first subtractor to generate a fourth output; and
   a gain controller controlling a gain of the fourth output of the limiter, the gain-controlled fourth output being subtracted from the current input image signal in the second subtractor to generate the second output.

32. An automatic moving object tracking method, comprising:
   photographing a monitoring area to generate an input image signal of each frame using a photographing unit;
   generating a binary disturbance image signal from input image signals of current and previous frames;
   generating a moving window, acquiring information about a moving object from the binary disturbance image by using the moving window, and adjusting a size of the initial tracking window in response to the information;
   estimating a location of the moving object in a following frame based on the centers of the moving object in the current and previous frame;
   acquiring an actual center of the moving object in the tracking window in the following frame;
   generating tracking status upon comparing the actual center of the moving object with the estimated center of the moving object; and
   controlling the photographing unit in response to the tracking status.

* * * * *

UNITED STATES PATENT AND TRADEMARK OFFICE
CERTIFICATE OF CORRECTION

PATENT NO. : 6,993,158 B2 Page 1 of 1
APPLICATION NO. : 10/212142
DATED : January 31, 2006
INVENTOR(S) : Jae-soo Cho et al.

It is certified that error appears in the above-identified patent and that said Letters Patent is hereby corrected as shown below:

On the Front page, Column 1, [73] Assignee: replace "Electronic" with --Electronics--, therefor.

Signed and Sealed this

Eleventh Day of July, 2006

JON W. DUDAS
*Director of the United States Patent and Trademark Office*